United States Patent [19]
Campau

[11] Patent Number: 5,850,972
[45] Date of Patent: Dec. 22, 1998

[54] LIQUID DISPENSER AND METHOD

[75] Inventor: Daniel N. Campau, Grand Rapids, Mich.

[73] Assignee: Flow-Rite Controls, Ltd., Grand Rapids, Mich.

[21] Appl. No.: 692,510

[22] Filed: Aug. 6, 1996

Related U.S. Application Data

[63] Continuation-in-part of Ser. No. 441,482, May 15, 1995, Pat. No. 5,634,592, which is a continuation-in-part of Ser. No. 231,742, Apr. 7, 1994, Pat. No. 5,542,605.

[51] Int. Cl.$^6$ .................................................. A24F 25/00
[52] U.S. Cl. ................................ 239/44; 239/68; 239/51; 222/187; 222/416
[58] Field of Search ................................ 239/44, 49, 50, 239/68, 37, 38, 43, 51; 222/71, 187, 416; 137/124

[56] References Cited

U.S. PATENT DOCUMENTS

| | | | |
|---|---|---|---|
| 3,216,663 | 11/1965 | Frampton et al. | 239/68 |
| 3,941,283 | 3/1976 | Garbe | 222/187 |
| 4,938,420 | 7/1990 | Ruttenberg | 239/68 |
| 5,238,187 | 8/1993 | Zlotnik et al. | 222/187 X |
| 5,542,605 | 8/1996 | Campau | 239/44 |

FOREIGN PATENT DOCUMENTS

B-41275/93  6/1996  Australia .

*Primary Examiner*—Robert J. Oberleitner
*Assistant Examiner*—Pamela J. Lipka
*Attorney, Agent, or Firm*—Niro, Scavone, Haller & Niro

[57] ABSTRACT

An automatic dispensing apparatus for dispensing liquid at discrete time intervals, including a reservoir for containing a dispensable liquid, a dispensing tube positioned within the reservoir and in fluid communication with the liquid within the reservoir, and a dome at least partially enclosing the dispensing tube. The improved design has only two dispenser components, and use of the dome eliminates any trapping of air bubbles which can delay or prevent dispensing. A method for using the dispensing apparatus also forms a part of the present invention.

7 Claims, 2 Drawing Sheets

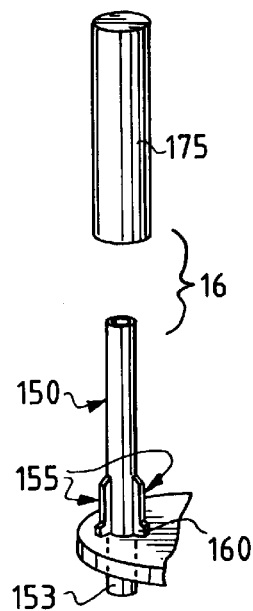
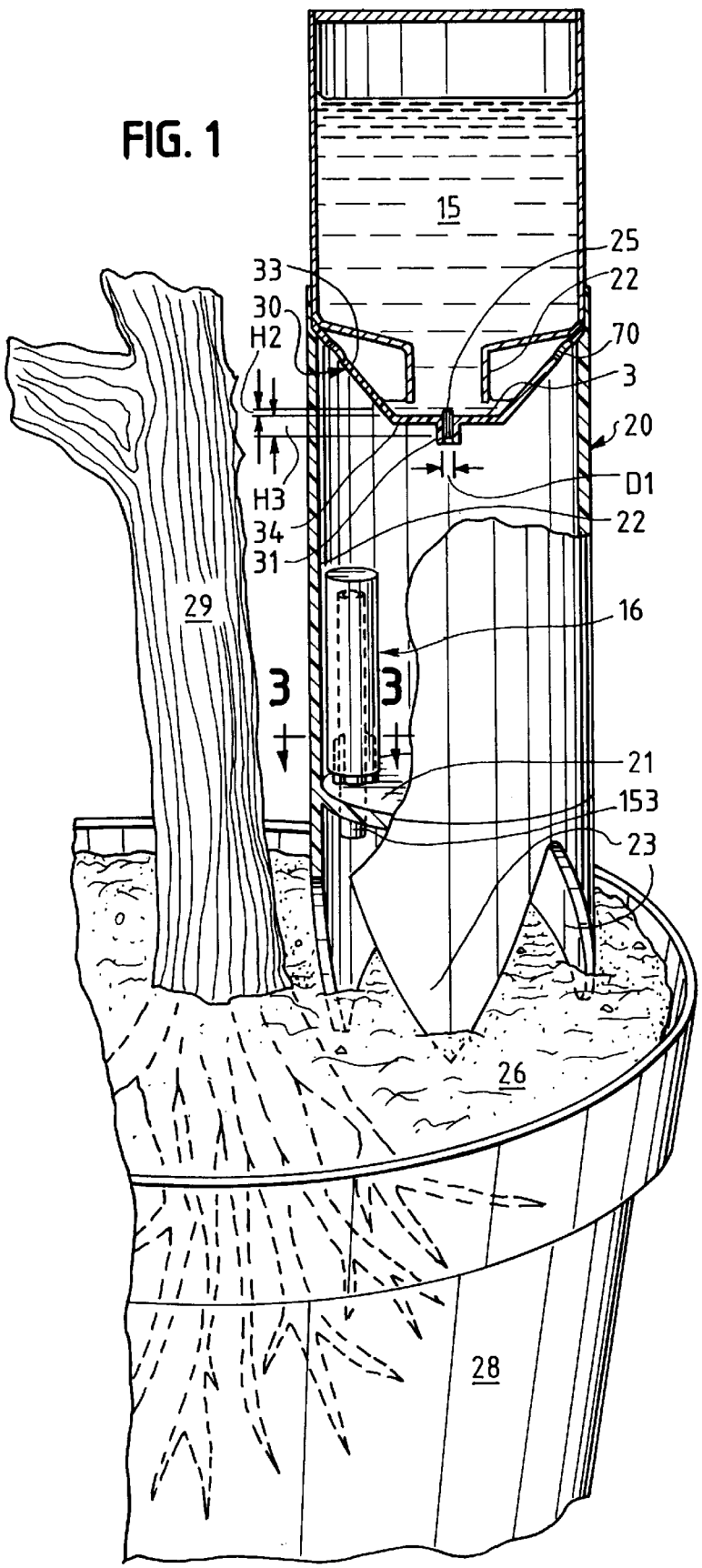

LIQUID DISPENSER AND METHOD

This application is a continuation-in-part of U.S. Ser. No. 08/441,482, filed May 15, 1995, titled "Flow Control Apparatus And Method For Making Same," now U.S. Pat. No. 5,634,592 which is a continuation-in-part of U.S. Ser. No. 08/231,742, filed Apr. 7, 1994 now U.S. Pat. No. 5,542,605.

U.S. Pat. Nos. 5,409,135, 5,353,957, and 5,542,605 are hereby incorporated by reference in their entirety into this application.

BACKGROUND OF THE INVENTION

The inventions referred to above relate generally to a liquid dispenser and a process for making and using such a dispenser. More particularly, they relate to an automatic liquid dispenser useful in a variety of applications in which a relatively constant, or an increasing or decreasing volume of liquid needs to be dispensed at periodic time intervals. Flow controls effecting fluidic system response are used.

Dispensing liquids on a periodic basis is a common task around the home, workplace, or laboratory. Typical applications that require liquid to be dispensed in a controlled fashion include plant watering/feeding, fertilizing, air freshening, drain cleaning, toilet bowl cleaning, pet watering, medicating, lubricating, humidifying and fumigating.

Devices for restricting flow, such as orifices and capillary tubes, have been used to dispense liquids. To achieve high resistances to flow when microflow rates are required, for example, orifices or extremely long capillary tubes are required. (As an example, "microflow rates" are defined here and in U.S. Pat. No. 5,542,605 as rates of about 0.3 millimeters per hour, or six drops per hour, or less; however, this invention is not restricted to those rates.) These types of flow restrictors can also be expensive to manufacture, and can be easily clogged.

These and other problems with known liquid dispensing devices are discussed in U.S. Pat. No. 5,542,605, and successful inventions are disclosed there for solving those problems. However, still further improvements are possible. For example, the siphon apparatus disclosed in the '605 patent is relatively expensive both as to material and labor costs, since three separate parts are needed, and multiple operations are required to assemble them. Performance enhancement is always a priority, as well.

The present invention accomplishes liquid drip dispensing at a reduced cost, and also provides a dispenser that is believed to be more reliable than any other of its kind.

SUMMARY OF THE INVENTION

In accordance with the present invention, an improved flow control device is provided that preserves the beneficial features and advantages of known flow control devices while at the same time overcoming disadvantages and achieving additional advantages.

In the preferred embodiment of the present invention, an automatic liquid dispensing apparatus for the dispensing of a controlled volume of liquid includes a reservoir adapted to hold a dispensable liquid, thereby defining a liquid level within the reservoir. A dispensing tube is positioned within the reservoir. The dispensing tube has an open upper end and terminates at a lower end in a dispensing nozzle positioned below the reservoir. A dome or cover is positioned within the reservoir and at least partially encloses the dispensing tube. At least one air/liquid intake port is positioned above the dispensing nozzle when the reservoir is oriented to dispense the liquid. The intake port(s) is in fluid communication with the upper end of the dispensing tube and with the reservoir. As dispensing begins, the liquid level within the reservoir and the liquid level within the dispensing tube are initially at the same start level. During dispensing, the liquid level within the reservoir drops while the liquid level within the dispensing tube remains at the start level. This continues until the liquid level within the reservoir has dropped sufficiently to allow air to enter the intake port, ceasing further dispensing.

The distance between the inside diameter of the dome and the outside diameter of the dispensing tube should be sufficiently large so as to permit the passage of an air bubble between the dispensing tube and the dome during dispensing. This will prevent the dispensing apparatus from "locking up" during dispensing.

In a particularly preferred embodiment, dispensing can occur at microflow rates. The dome in the particularly preferred embodiment is hollow and cylindrical, and preferably extends downward to a position adjacent the base of the reservoir. In this embodiment, dispensing tube includes a plurality of ribs concentrically spaced about the lower outside surface of the dispensing tube; the ribs facilitate the positioning of the dome with respect to the dispensing tube and reservoir.

Preferably, the liquid dispensing apparatus of the present invention is used with a flow regulator in fluid communication both with the reservoir and a second reservoir. The flow regulator is configured to permit a controlled rate of flow of the liquid out of the second reservoir which is independent of the liquid level within the second reservoir.

A method for automatically dispensing a controlled volume of liquid also forms a part of the present invention, and includes the steps of: providing a reservoir adapted to hold a dispensable liquid, thereby defining a liquid level within the reservoir; positioning a dispensing tube within the reservoir, the dispensing tube having an open upper end and terminating at a lower end in a dispensing nozzle positioned below the reservoir; at least partially enclosing the dispensing tube with a cover; providing at least one air/liquid intake port positioned above the dispensing nozzle when the reservoir is oriented to dispense the liquid, the at least one intake port being in fluid communication with the upper end of the dispensing tube and with the reservoir; beginning to dispense the liquid from the reservoir when the liquid level within the reservoir and the liquid level within the dispensing tube is initially at the same start level; continuing to dispense the liquid from the reservoir as the liquid level within the reservoir drops while the liquid level within the dispensing tube remains at the start level; and terminating dispensing when the liquid level within the reservoir has dropped sufficiently to allow air to enter the intake port.

BRIEF DESCRIPTION OF THE DRAWINGS

These and other features, objects, and advantages of the present invention will become apparent from the following description of the drawings wherein like reference numerals represent like elements in the several views, and in which:

FIG. 1 is a side perspective view, in partial cross-section, of a liquid dispenser of my design shown mounted within the soil of a potted plant;

FIG. 2 is an exploded parts view of the dispenser and dome assembly of the liquid dispenser of my invention;

FIG. 3 is a cross-sectional view taken along section line 3—3 of FIG. 2;

DETAILED DESCRIPTION OF THE PREFERRED EMBODIMENT

Figure 4:
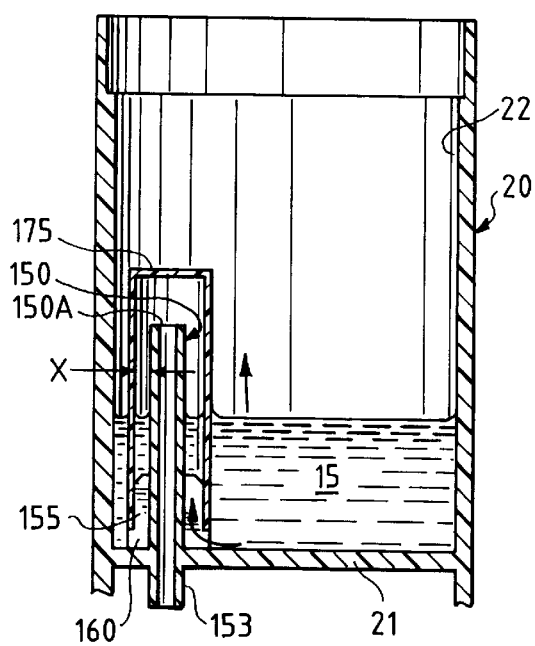
FIG. 4 is a side cross-sectional view of my invention showing a condition in which the liquid to be dispensed is rising within similar to FIG. 3 in which the level of the dispensed liquid is rising within the dispensing container.
Figure 5:
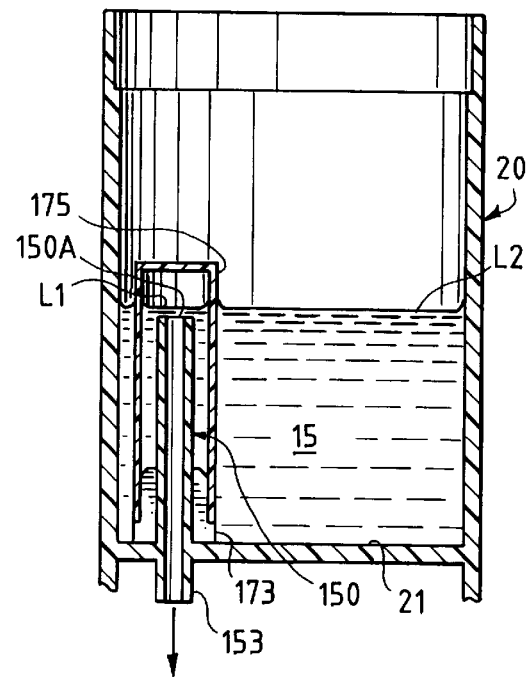
FIG. 5 is a view similar to FIG. 4 in which the liquid to be dispensed has reached a maximum level within the dispensing container.

The structure, function and operation of the liquid dispenser of my present invention is similar to that of the dispenser disclosed in U.S. Pat. No. 5,542,605, when that dispenser is used with the inverted container and flow regulator disclosed there, with the differences noted below. Essentially, the timing and dispensing assembly of the '605 patent is replaced by the two-component siphon assembly of the present invention.

A preferred embodiment of the automatic liquid dispenser apparatus of my design, a plant waterer, is shown generally as 10 in FIG. 1. Liquid dispenser 10 includes an inverted liquid storage container or reservoir, generally designated 80, which houses a liquid 15 to be dispensed. Container 30 terminates at its lower end in nozzle 22, which is in fluid communication with flow reservoir 80.

The structure and operation of flow reservoir 30 is fully disclosed in the '605 patent, and is only briefly described here. Flow regulator 30 has tapering sidewalls 33, a planar bottom surface 34, and a flow regulator discharge port 31 which is press-fit into the upper portion of mounting base 50, as shown in FIG. 1. A hydrophilic restrictor 25 is inserted in a press-fit relationship within a portion of flow regulator port 31, as also shown in FIG. 1. A constant volume of liquid is dispensed at periodic intervals from liquid dispenser 80. The flow regulator 30 is in communication with container 80 and controls the rate of flow out of the container. Depending on the particular application and the type of flow regulator used, the period can increase, remain constant, or decrease as the liquid level in container 80 drops, as explained in the '605 patent.

Liquid dispensed from flow regulator 30 drops into a second reservoir or storage container 20. (A single reservoir, instead of separate containers 20 and 80, could of course be used, with an intermediate portion of the single reservoir including the flow regulator 30.) This second liquid storage reservoir 20 includes a base 21 and walls 22 for containing the liquid to be dispensed, and prongs 23 which are placed into the soil 26 of pot 28 containing plant 29.

Referring to FIGS. 2 and 3, the timing and dispensing assembly disclosed in the '605 patent is replaced by the simple siphon dispenser of the present invention, which includes only two structural components: a riser or dispensing tube 150, and a dome or cover 175. Dome 175 is impervious to non-corrosive gases or liquids. Dispensing tube 150 is preferably molded with reservoir 20, but can be formed as a separate, press-fit component, for example. Dispensing tube 150 includes equally spaced ribs 155 positioned concentrically about dispensing tube 150, as shown, to facilitate the positioning of dome 175 with respect to tube 150 and reservoir 20. Dispensing tube 150 also terminates in a dispensing nozzle 153, which is also preferably molded with reservoir 20. Cylindrical dome 175 is press-fit over ribs 150 to preferably substantially enclose dispensing tube 150. Dome 175 need not enclose most of the length of tube 150, but dispensing will cease when the liquid level within the reservoir reaches the end of the dome (where intake port 173 is formed between the dome and dispensing tube 150); for this reason, it is preferred to extend the sides of dome 175 down until they are closely adjacent the bottom surface 21 of reservoir 20.

The resulting siphon tube assembly, generally designated as 16, is shown in assembled form in the drawings. A lower portion of the ribs forms a stop 160 to maintain clearance under dome 175, as shown.

Although in the preferred embodiment the dome forms a hollow cylinder, the dome can take a variety of shapes and sizes, with this constraint: distance "X" (FIG. 4) between the OD of tube 150 and the ID of dome 175 should be sufficient to allow the passage of air bubbles that might form upon entry of liquid beneath the dome and up the reservoir along the side of tube 150.

This design accomplishes a siphoning action without the disadvantages associated with the U-shaped "tube-type" siphon disclosed in U.S. Pat. No. 5,542,605. only two molded parts, dispensing tube 150 and dome 175, are necessary; to assemble, they are simply press-fit together using finger pressure. The U-shaped tube and bracket disclosed in the '605 patent are eliminated. The labor associated with cutting the U-shaped siphon tube to length, attaching it to the bracket, and then pressing the bracket into a reservoir socket is also eliminated.

Figure 6:
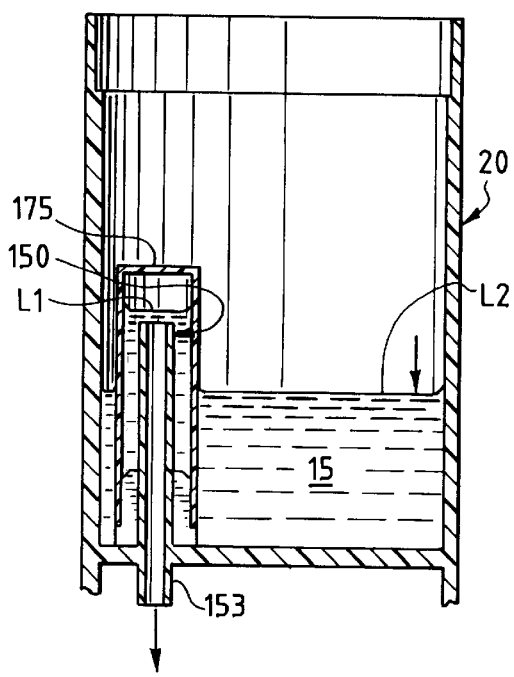
FIG. 6 is a view similar to FIG. 4 in which the dispensed liquid level is dropping within the dispensing container.

Referring now to FIGS. 4–7, the dispensing cycle for siphon tube assembly 16 is shown, with the arrows indicating the direction of liquid or air, as shown. Referring first to FIG. 4, liquid to be dispensed is added to reservoir 20, and passes beneath dome 175, rising upward until it reaches a maximum level "L". At this maximum level, shown in FIG. 5, the dispensing liquid has risen above the top of dispensing tube 150, and dispensing through dispensing nozzle 153 has begun. Referring to FIG. 6, dispensing automatically continues as the level of the dispensing liquid 15 drops; as this occurs, however, the level of liquid within dispensing tube 150 remains at a constant level "L1," which is equal to the level of liquid within the reservoir "L2".

Figure 7:
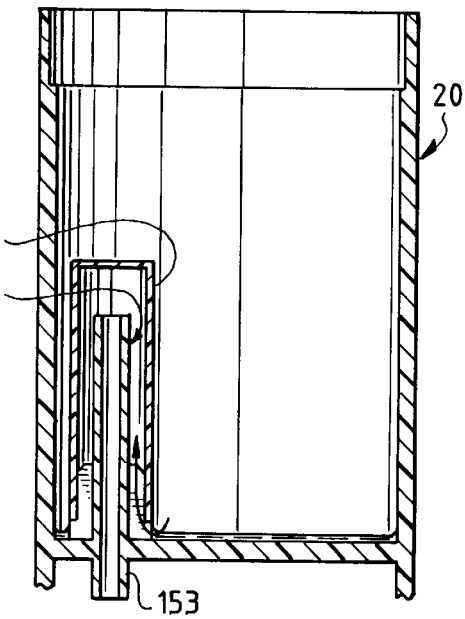
FIG. 7 is a view similar to FIG. 4 in which the dispensing container has been emptied of liquid, and air is permitted to enter the dome.

Finally, once the level of liquid within reservoir 20 has dropped to a level sufficient to allow air to enter beneath dome 175 and into dispensing tube 150, dispensing ceases (see FIG. 7). Thus, the negative pressure formed by the siphoning action of dispensing tube 150 is terminated when air bubbles enter port 173 (FIG. 7), filling tube 150. Liquid present within the dome simply falls back into the reservoir.

It has been found that the siphon of the present invention operates independent of the height of dome 175 above dispensing tube 150, as long as this distance is sufficiently large to prevent surface tension effects. In the particularly preferred embodiment shown in the drawings, and using water as the dispensing liquid, dome 175 is set about one-quarter (¼) inch above the upper end 150A of dispensing tube 150, and the dome clearance off the floor 21 of reservoir 20 is about one-eighth (⅛) inch. However, several different dome clearance heights above the upper end of dispensing tube were tested, and the dispensing operation was the same.

In addition to the cost reduction benefit of my invention, discussed above, the performance of my new siphon is also believed to be more reliable than any other known type. Although the siphon is more compact than the U-shaped siphon tube disclosed in the '605 patent, the inside diameters are larger, permitting faster dispensing. This also eliminates any trapping of air bubbles which can delay or prevent dispensing. Elimination of air bubble susceptibility also allows the inside diameter of dispensing tube 150 to be larger than that used with the U-shaped siphon tube of the '605 patent, permitting more rapid dispensing, if desired.

Those who have read the '605 patent will appreciate that the use of dome 175 also eliminates the need to precisely position the siphoning U-shaped tube above the surface of the timing assembly disclosed in the '605 patent, to avoid the formation of air bubbles which can break the siphon action.

Siphon tube assembly 16 thus provides an efficient, compact, and more accurate and reliable way of providing liquid dispensing that is not susceptible to surface tension lock-up.

Although the present invention has been disclosed with reference to the preferred embodiment of a plant waterer, it will be recognized that dispensing devices made according to my invention can be used in a variety of applications. As one example, although the sizes for air freshener dispensers will generally be smaller than for plant waterers, the same general design principles apply.

In certain dispensing applications it may be desirable to dispense a liquid at rates above the microflow rates mentioned above. The inventor has determined that siphon tube assembly 16 can be used for dispensing at rates far exceeding microflow rates, and the invention is not to be limited to use of a dispensing apparatus for only such small dispensing rates.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. An automatic liquid dispensing apparatus for the dispensing of a controlled volume of liquid, comprising:

a reservoir adapted to hold a dispensable liquid, thereby defining a liquid level within the reservoir;

a hydrophillic restrictor positioned inside a flow regulator, said restrictor adapted to dispense the liquid at microflow rates into the reservoir;

a dispensing tube positioned within the reservoir, the dispensing tube having an open upper end and terminating at a lower end in a dispensing nozzle positioned below the reservoir;

a dome positioned within the reservoir and at least partially enclosing the dispensing tube, the dome having a top portion positioned sufficiently above a top portion of the dispensing tube to permit the passage of an air bubble between the dispensing tube and the dome during dispensing;

at least one air/liquid intake port positioned above the dispensing nozzle when the reservoir is oriented to dispense the liquid, the at least one intake port being in fluid communication with the upper end of the dispensing tube and with the reservoir;

wherein the liquid level within the reservoir and the liquid level within the dispensing tube are initially at the same start level, and as dispensing occurs the liquid level within the reservoir drops while the liquid level within the dispensing tube remains at the start level, until the liquid level within the reservoir has dropped sufficiently to allow air to enter the intake port.

2. The automatic liquid dispensing apparatus of claim 1, wherein the dome is hollow and cylindrical.

3. The automatic liquid dispensing apparatus of claim 1, wherein the dispensing tube includes a plurality of ribs concentrically spaced about the lower outside surface of the dispensing tube, the ribs facilitating the positioning of the dome with respect to the dispensing tube and reservoir.

4. The automatic liquid dispensing apparatus of claim 1, further comprising a flow regulator in fluid communication both with the reservoir and a second reservoir, the flow regulator being configured to permit a controlled rate of flow of the liquid out of the second reservoir which is independent of the liquid level within the second reservoir.

5. The automatic liquid dispensing apparatus of claim 1, wherein the internal surface of the dome is substantially smooth and devoid of internal obstructions which may trap water.

6. An automatic liquid dispensing apparatus for the dispensing of a controlled volume of liquid, comprising:

a reservoir adapted to hold a dispensable liquid, thereby defining a liquid level within the reservoir;

a hydrophillic restrictor positioned inside a flow regulator, said restrictor adapted to dispense the liquid at microflow rates into the reservoir;

a dispensing tube positioned within the reservoir, the dispensing tube having an open upper end and a lower dispensing end positioned below the reservoir;

a cover positioned within the reservoir and at least partially enclosing the dispensing tube, the "cover" having a top portion positioned sufficiently above a top portion of the dispensing tube to permit the passage of an air bubble between the dispensing tube and the cover during dispensing;

at least one air/liquid intake port positioned above the dispensing end of the dispensing tube when the reservoir is oriented to dispense the liquid, the at least one intake port being in fluid communication with the upper end of the dispensing tube and with the reservoir;

wherein the liquid level within the reservoir and the liquid level within the dispensing tube is initially at the same start level, and as dispensing occurs the liquid level within the reservoir drops while the liquid level within the dispensing tube remains at the start level, until the liquid level within the reservoir has dropped sufficiently to allow air to enter the intake port.

7. A method for automatically dispensing a controlled volume of liquid, comprising the steps of:

providing a reservoir adapted to hold a dispensable liquid, thereby defining a liquid level within the reservoir;

a hydrophillic restrictor positioned inside a flow regulator, said restrictor adapted to dispense the liquid at microflow rates into the reservoir;

positioning a dispensing tube within the reservoir, the dispensing tube having an open upper end and terminating at a lower end in a dispensing nozzle positioned below the reservoir;

at least partially enclosing the dispensing tube with a cover, the cover having a top portion positioned sufficiently above a top portion of the dispensing tube to permit the passage of an air bubble between the dispensing tube and the cover during dispensing;

providing at least one air/liquid intake port positioned above the dispensing nozzle when the reservoir is oriented to dispense the liquid, the at least one intake port being in fluid communication with the upper end of the dispensing tube and with the reservoir;

beginning to dispense the liquid from the reservoir when the liquid level within the reservoir and the liquid level within the dispensing tube is initially at the same start level;

continuing to dispense the liquid from the reservoir as the liquid level within the reservoir drops while the liquid level within the dispensing tube remains at the start level; and terminating dispensing when the liquid level within the reservoir has dropped sufficiently to allow air to enter the intake port.

* * * * *